United States Patent
Sobolak et al.

(10) Patent No.: US 10,317,929 B2
(45) Date of Patent: Jun. 11, 2019

(54) LOCKING AND UNLOCKING MECHANISM

(71) Applicant: Hamilton Sundstrand Corporation, Charlotte, NC (US)

(72) Inventors: Piotr Sobolak, Słupsk (PL); Piotr Strączek, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 44 days.

(21) Appl. No.: 15/603,627

(22) Filed: May 24, 2017

(65) Prior Publication Data
US 2018/0052484 A1 Feb. 22, 2018

(30) Foreign Application Priority Data

Aug. 16, 2016 (EP) .................................... 16461548

(51) Int. Cl.
*G05G 5/08* (2006.01)
*B64D 41/00* (2006.01)

(52) U.S. Cl.
CPC ............. *G05G 5/08* (2013.01); *B64D 41/007* (2013.01)

(58) Field of Classification Search
CPC ........ B64D 41/007; G05G 5/08; B60T 1/005; F16H 63/3433; F16H 61/22; F16B 15/261
See application file for complete search history.

(56) References Cited

U.S. PATENT DOCUMENTS

| 3,703,941 A * | 11/1972 | Ohie ...................... B60T 1/005 188/31 |
|---|---|---|
| 8,640,563 B2 | 2/2014 | Lang et al. |
| 9,193,472 B2 | 11/2015 | Sasscer |
| 2013/0228412 A1 | 9/2013 | Scherer et al. |
| 2013/0327207 A1 | 12/2013 | Sasscer et al. |
| 2015/0096437 A1 | 4/2015 | Russ |
| 2015/0232195 A1 | 8/2015 | Bannon |

FOREIGN PATENT DOCUMENTS

GB      2042077 A * 9/1980 ............. B01D 25/19

OTHER PUBLICATIONS

European Search Report for Application No. 16461548.6-1754, dated Dec. 5, 2016. 6 pages.

* cited by examiner

*Primary Examiner* — Thomas C Diaz
(74) *Attorney, Agent, or Firm* — Cantor Colburn LLP

(57) ABSTRACT

A locking mechanism for releasably locking a lock bolt against axial movement includes: a locking mechanism for releasably locking a lock bolt against axial movement, and: an elongate member 1 axially moveable relative to a housing and, in use, in moveable engagement with a lock bolt. The mechanism also includes a flap assembly 2 moveable between a first, closed position, located between the elongate member and the housing so as to prevent axial movement of the elongate member towards the housing, and a second, open position allowing the elongate member to move axially towards the housing.

15 Claims, 6 Drawing Sheets

LOCKING AND UNLOCKING MECHANISM

FOREIGN PRIORITY

This application claims priority to European Patent Application No. 16461548.6 filed Aug. 16, 2016, the entire contents of which is incorporated herein by reference.

TECHNICAL FIELD

The present disclosure relates to locking/unlocking mechanisms for deployable components. The mechanism is particularly suitable as an unlocking mechanism for a ram air turbine (RAT) actuator but could also find application in other deployable or movable systems such as other actuators, valves, pumps and the like.

BACKGROUND

Many systems and mechanisms are known in which a component is movable between a closed or stowed position and an open or deployed position, and wherein a component should be locked in the desired position and unlocked to permit movement between the positions. Particular examples are valves or actuators, such as RAT actuators as described in more detail below.

Locking mechanisms are known to secure the actuator, valve etc. in a particular position, and unlocking mechanisms are known to release the locking mechanism and permit movement of the actuator/valve components to a different position, whereupon the actuator components can then also be locked in the second position by means of a locking mechanism. A locking mechanism for a RAT actuator is disclosed, for example, in US 2013/0327207.

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn, due to the airflow, and generates electrical and/or hydraulic power. The RAT is typically pivoted into position by means of an actuator, for example a hydraulic actuator. The actuator typically includes a lock bolt which extends to deploy the RAT. The actuator has a lock mechanism which prevents inadvertent movement of the lock bolt and, thus, inadvertent deployment of the RAT. The main locking mechanism typically comprises a spring loaded lock bolt which must be moved in an axial direction to unlock the actuator. Such an actuator is disclosed, for example, in US 2015/0232195. RAT actuators are also disclosed in U.S. Pat. Nos. 8,640,563, 9,193,472 and US 2015/0096437.

An unlocking mechanism is provided to permit the axial bolt movement. A conventional unlocking mechanism is shown, for example, in FIGS. 2A and 2B, comprising a linkage arrangement, one end of which is rotatably coupled to one end of the lock bolt and the other end of which is axially fixed and rotatably coupled to, for example, a mounting wall. A solenoid moves the link between a locked (FIG. 2A) and an unlocked (FIG. 2B) position. In the locked position, the linkage assembly pushes against the lock bolt against the force of the lock bolt spring to prevent axial movement of the lock bolt. When it is required to deploy the RAT, the lock bolt needs to be released for axial movement of the actuator. As seen in FIG. 2B, a pull force, greater than the spring force, is exerted on the linkage assembly by means of a solenoid, which moves the linkage assembly out of engagement with the lock bolt. This allows the lock bolt to move axially to initiate actuator unlocking to permit deployment. The solenoid must have sufficient force to displace the lock bolt against the force of the lock bolt spring and the linkages and joints require sufficient axial and radial space and may also be prone to wear or damage.

The size and weight of components is of particular concern in aircraft where there is a desire to use lighter and smaller components, whilst maintaining safety and reliability.

There is a desire, therefore, to provide a locking/unlocking mechanism for such systems to prevent/permit axial movement of a component such as a lock bolt, without the need for such large solenoids and a series of links.

SUMMARY

The present invention provides a locking mechanism for releasably locking a lock bolt against axial movement, the mechanism comprising an elongate member axially moveable relative to a housing and, in use, in moveable engagement with a lock bolt; a flap assembly moveable between a first, closed position, located between the elongate member and the housing so as to prevent axial movement of the elongate member towards the housing, and a second, open position allowing the elongate member to move axially towards the housing.

Preferably, the flap assembly comprises a plurality of flaps arranged around the end of the piston biased to lie flat in the axial direction between the piston and the housing in the closed position and to open out, away from the closed position, to release the piston to move relative to the housing, thus allowing axial movement of the lock bolt.

Most preferably, the flaps are driven to their open position, against the force of biasing means such as torsion means that bias them in the closed position, by activation of a drive means such as a pull solenoid pulling a rod or plunger that draws the flaps first towards the housing. The engagement force together with, in the preferred embodiments, a chamfered engagement surface, forces the flaps outwards as they are pulled more against the housing.

In a preferred embodiment, the mechanism comprises two such solenoid assemblies. The disclosure also provides an actuator assembly comprising a lock bolt and such a locking mechanism.

BRIEF DESCRIPTION OF THE DRAWINGS

Preferred embodiments will now be described by way of example only and with reference to the accompanying drawings in which.

DETAILED DESCRIPTION

Figure 1:
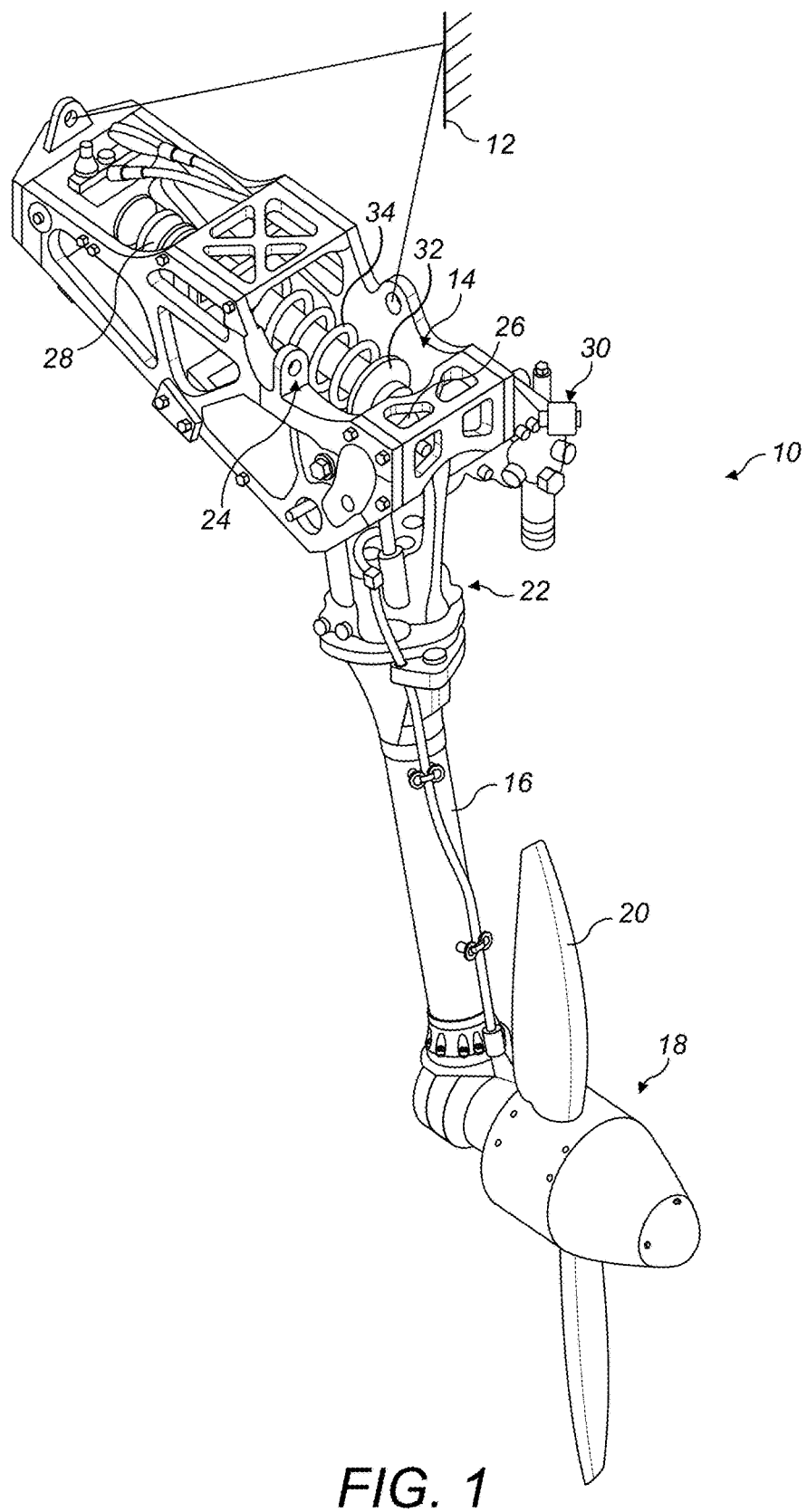
FIG. 1 shows a ram air turbine (RAT)

FIG. 1 shows a RAT system 10 which is secured to an aircraft structure 12 by housing 14. The housing 14 pivotally supports a strut 16 having a turbine 18 at one end. The turbine 18 includes blades 20 which impart rotational drive to a generator 22 and a hydraulic pump 30, for example. An actuator 24 is secured to the strut at a first end 26 and to the housing at a second end 28. The actuator 24 is illustrated in its deployed position. The actuator 24 comprises a cylinder 32 which is biased by a spring 34 in order to deploy the strut 16. When the cylinder 32 is retracted, it is held in its retracted position by means of a lock bolt of a locking mechanism, details of which will be described below.

The unlocking of the actuator is initiated by permitting movement of the lock bolt 38. This is made possible by means of a release mechanism according to the present disclosure which will be described further below.

Figure 2A:
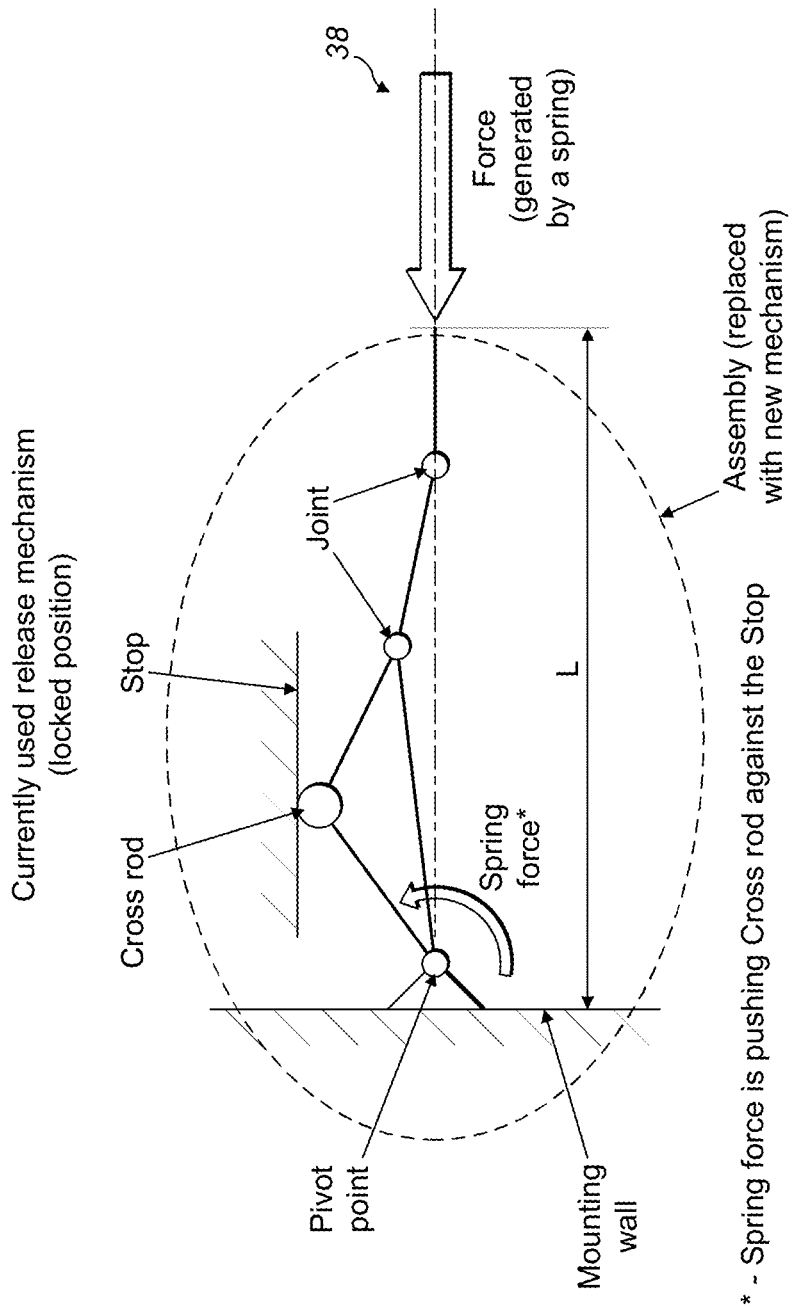
FIG. 2A shows a schematic view of a typical linkage release mechanism in the locked position.
Figure 2B:
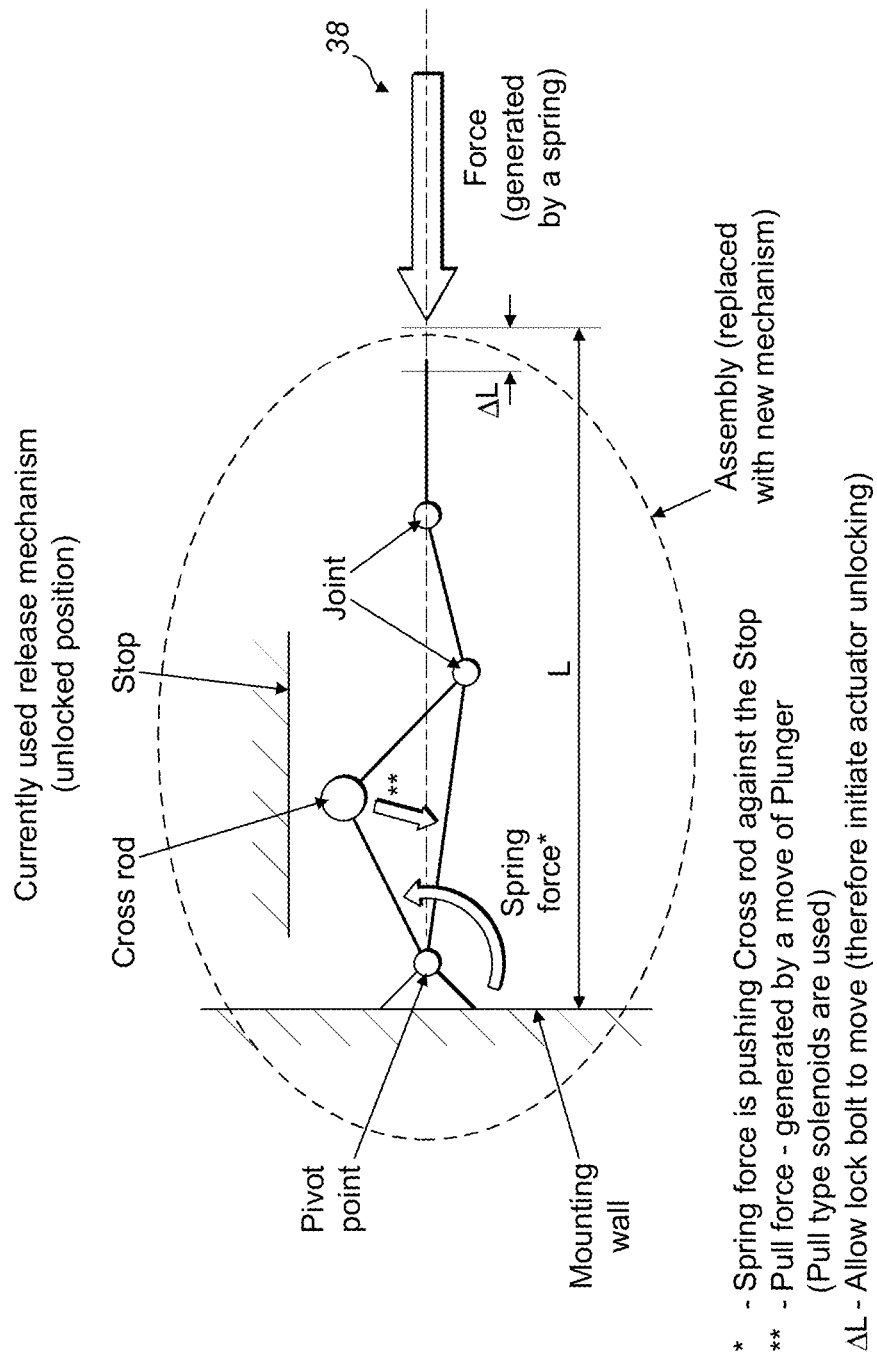
FIG. 2B shows the mechanism of FIG. 2A in the unlocked position.
Figure 3A:
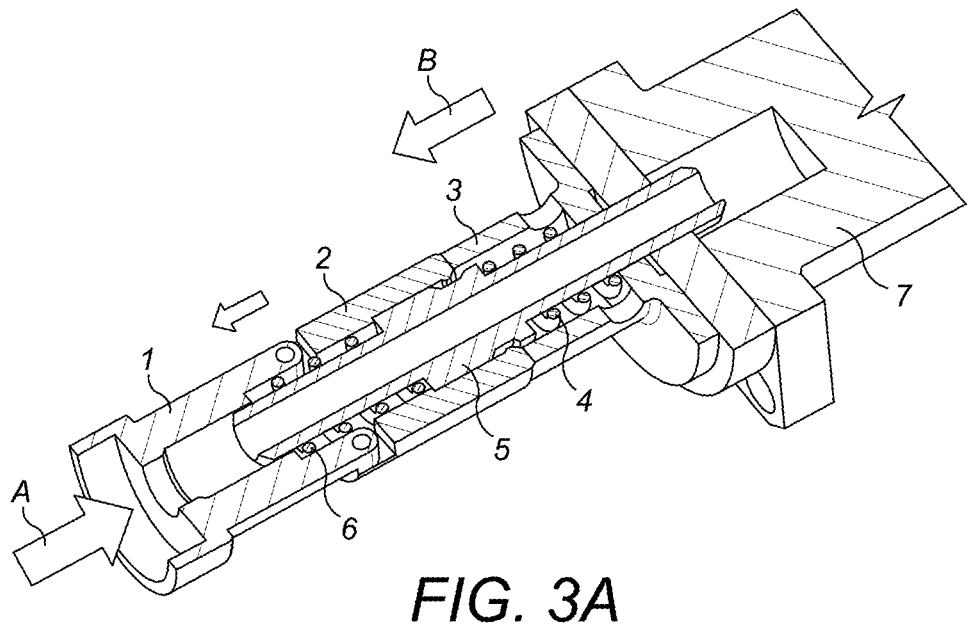
FIG. 3A is a cut-away view of the locking mechanism of the present disclosure in the locked position.
Figure 3B:
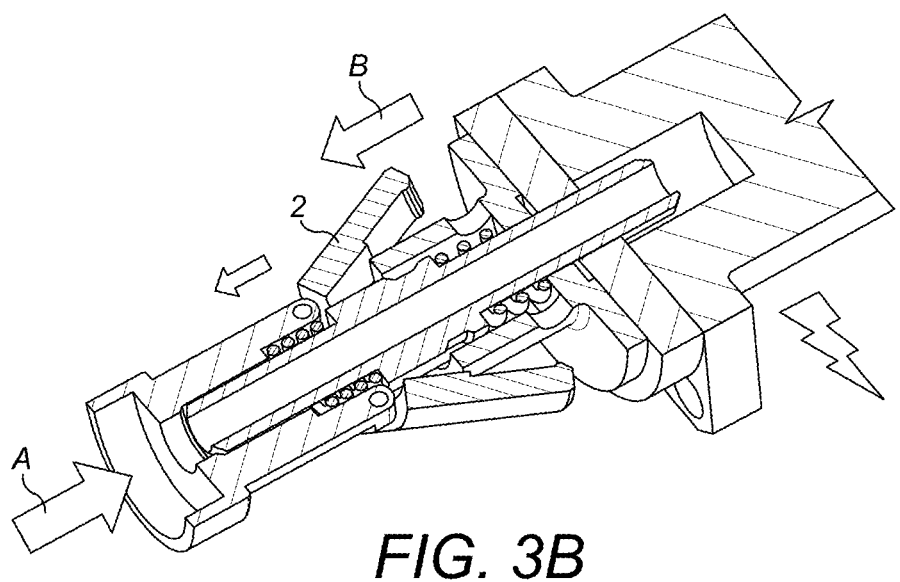
FIG. 3B is a cut-away view of the locking mechanism of the present disclosure in the unlocked position.

Referring now to the drawings, FIGS. 3A and 3B show a schematic view of the release mechanism which would replace the conventional, linkage-type mechanism shown within the dashed lines of FIGS. 2A and 2B.

FIG. 3A shows the piston 1 in the locked position and, in FIG. 3B, in the unlocked position permitting movement of the piston 1 and the lock bolt 38 for deployment of the actuator.

Figure 4A:
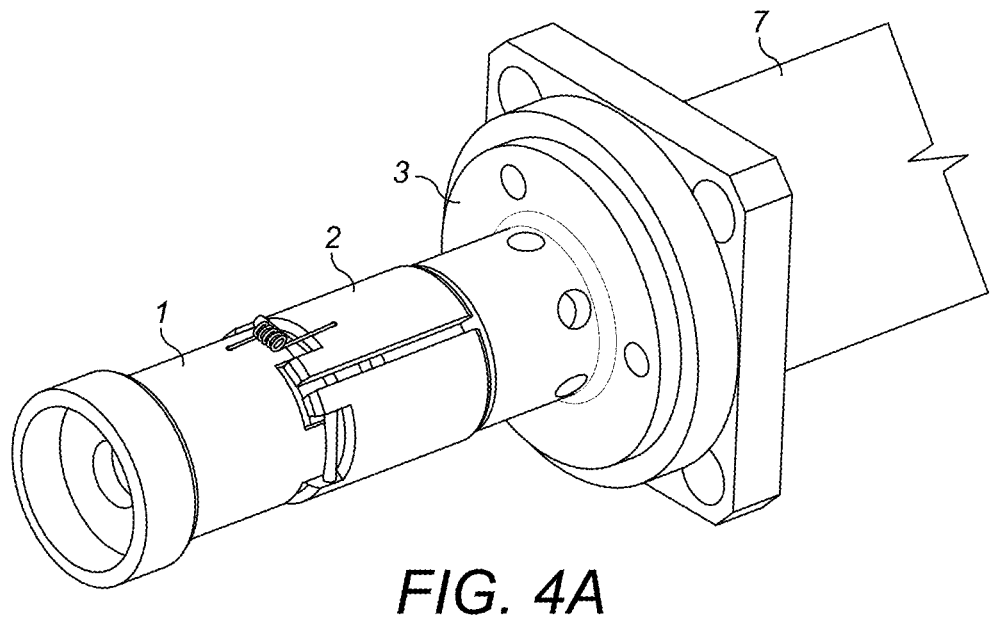
FIG. 4A is a perspective view of the locking mechanism of FIG. 3A.
Figure 4B:
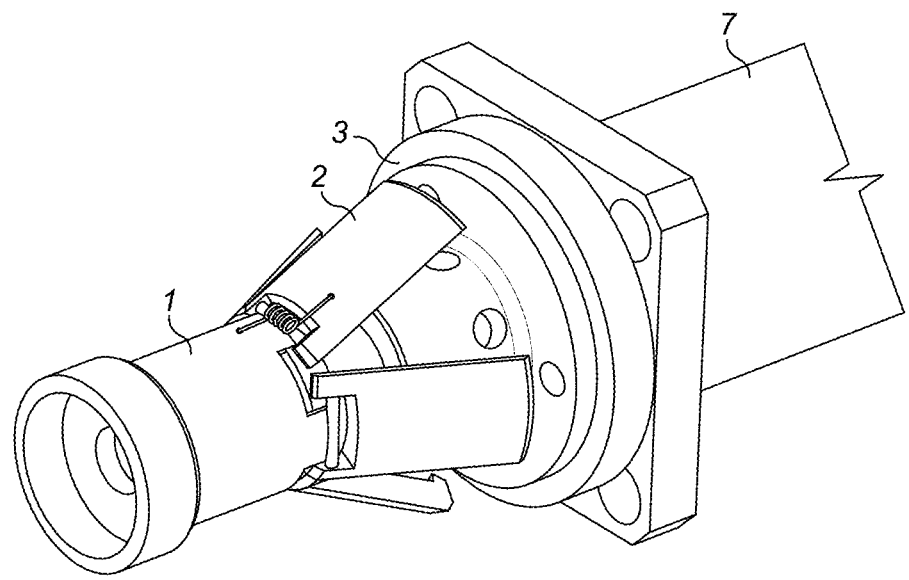
FIG. 4B is a perspective view of the locking mechanism of FIG. 3B.

FIGS. 4A and 4B show the components of FIGS. 3A and 3B in a complete perspective view.

To release the actuator, the lock bolt 38 needs to be able to move axially, which means that the piston 1 needs to be able to move axially. To lock the actuator position, the piston 1, and hence the lock bolt 38, need to be prevented from axial movement. In the present disclosure, axial movement of the piston 1 is prevented by rotatable flaps 2 that, in their closed position, fit and abut between the piston and a housing. If the flaps 2 are rotated out of their position between the piston and the housing, the piston is then able to move axially relative to the housing.

In the embodiment shown, the locking mechanism comprises the flaps 2 rotatably mounted between the piston 1 and the housing, more preferably rotatably attached to the piston end. The flaps 2 are biased to be in a closed position—i.e. directed radially inwards relative to the assembly axis so that they fill the space between the piston 1 and the housing. In the embodiment shown, the flaps are biased closed by means of a torsion spring 8. The flaps 2 are mounted around the assembly axis. The embodiment shown comprises four flaps attached around the end of the piston; other numbers of flaps can also be used provided the flaps provide an abutment between the piston and the housing when closed.

In the embodiment shown, a sleeve 3 is provided, attached to and extending from the housing and the flaps 2, when closed, abut against the sleeve 3 rather than directly against the housing.

Within and extending from the housing and extending within the flaps 2 and into the piston 1 is an action plunger 5 which can be driven axially relative to the sleeve 3 and the housing by a drive means such as a solenoid 7.

The action plunger is supported against the sleeve 3 or housing wall by a plunger spring 4 which biases the action plunger 5 away from the housing wall. A second spring 6 is provided between the other end of the action plunger 5 and the piston 1.

In the 'normal' locked position, the lock bolt 38 acts on the piston (under control of the actuator hydraulic control system, not shown) in the direction of arrow A. The force of the torsion springs 8 biases the flaps 2 inwards in a closed position. The force in the direction of arrow A is greater than that of the action plunger spring force acting in the direction of arrow B.

In the locked position, the solenoid 7 is de-energized. The resulting forces result in the assembly taking the position shown in FIGS. 3A and 4A where the flaps are closed and create an abutment between the piston and the housing (here via sleeve 3), the force in the direction of arrow A holds the locked position and the piston (and thus also the lock bolt 38) are unable to move axially.

In this position, some of the actuator force acting in direction A is transmitted to the action plunger 5 thus decreasing the possibility of an uncommanded deploy by undesired release of the flaps 2.

To unlock the system and allow movement of the piston 1 and thus the lock bolt 38 to release the actuator, the drive means e.g. solenoid 7, is energized or activated. This causes the action plunger 5 to move axially towards the housing against the force of the action plunger spring 4. In this embodiment, the drive means is a pull-type solenoid 7 and the action plunger 5 is a ferromagnetic component that is pulled responsive to energising of the solenoid. Of course, other ways of moving the action plunger 5 can also be envisaged.

Figure 5A:
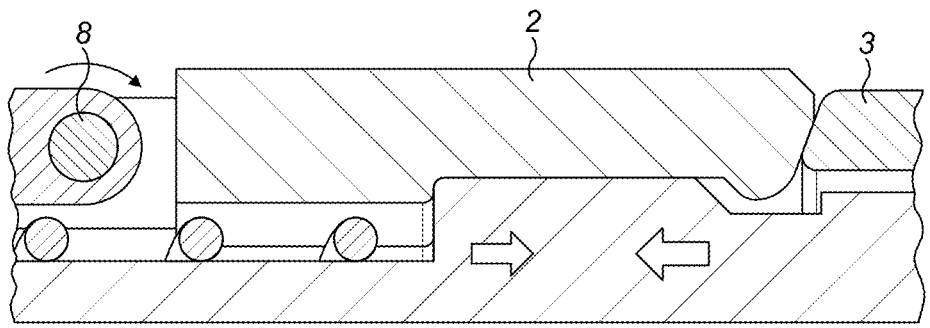
FIGS. 5A-5C show, as cut-away views, the releasing stages of the locking mechanism.
Figure 5B:
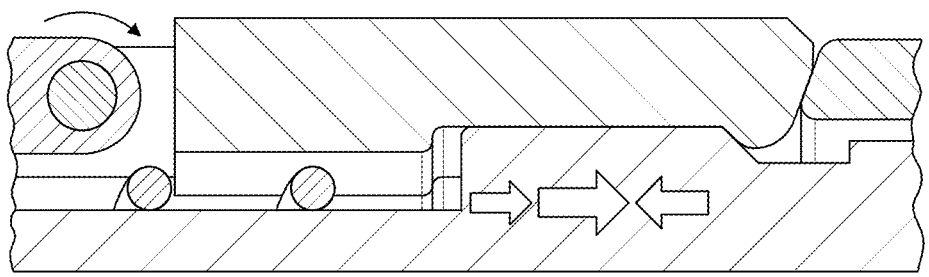
Figure 5C:
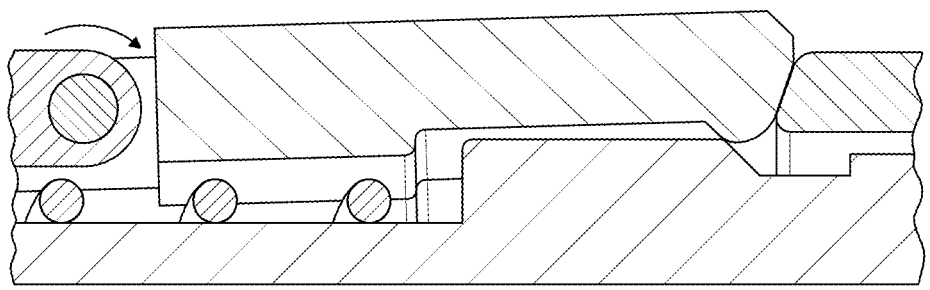

As the action plunger 5 is pulled out of the locked position it pulls the piston and thus exerts a force on the closed flaps 2 against the sleeve 3/housing. Because the sleeve/housing is fixed, the free ends of the flaps 2 are forced outwards against the force of the torsion springs 8 to a radially open position. This can best be seen in FIGS. 5A-5C. In the preferred embodiment, this opening movement is simplified and smoothed by providing a chamfered surface contact between the flap ends and the sleeve 3/housing (see FIGS. 5A-5C). With the flaps 2 extended outwards, the piston 1 and lock bolt 38 are now free to move relative to the housing as can be seen in FIGS. 3B and 4B in the direction of arrow A.

As the piston 1 moves in the direction A, the second spring 6 is compressed and the piston 1 can move over the outer surface of the action plunger 5 until the second spring 6 is fully compressed. The action plunger 5 thus also acts as a guide rail for the piston.

As the force of the second spring 6 is less than that of the action plunger spring 4, and the force of the action plunger spring 4 is less than that of the lock bolt 38 (arrow A), second spring 6 is compressed first, then action plunger spring 4 is compressed until the mechanism has reached is complete unlocked state—i.e. piston 1 full stroke.

When the force on the lock bolt in direction A is removed or released by the actuator control hydraulics, the force of springs 4 and 6 can then push the piston 1 back in the direction of arrow B back to the locked state and the flaps return to their closed position.

The second spring 6 has two functions, namely to reduce the impact of the piston 1 during mechanism unlocking and also to move the piston 1 back to the locked position when the lock bolt force (arrow A) is not acting on the piston 1.

The arrangement of the present release mechanism requires significantly fewer component parts as compared to the linkage system of the prior art, which, in turn, reduces the manufacturing, assembly and testing costs and avoids the need for shims as in the prior art systems. This can result in a more reliable and smaller deployment system, as smaller forces have to be overcome by the solenoid. The arrangement is less susceptible to vibrations and is therefore more secure in the locked position than conventional mechanisms. Only small forces, which can be easily calculated, are required to actuate the mechanism and the system is better able to absorb impact at the end of deployment due to the springs.

This mechanism could be easily adapted to existing actuators.

The above is a description of a single embodiment by way of example only. Modifications may be made without departing from the scope of this disclosure.

While the apparatus has been described in the context of unlocking a RAT actuator, it may, as mentioned above, find use in other applications, for example of the types of actuator, valves, pumps or the like.

The invention claimed is:

1. A locking mechanism for releasably locking a lock bolt against axial movement, the mechanism comprising:
    an elongate member axially moveable relative to a housing and, in use, in moveable engagement with a lock bolt;
    a flap assembly moveable between a first, closed position, located between the elongate member and the housing so as to prevent axial movement of the elongate member towards the housing, and a second, open position allowing the elongate member to move axially towards the housing; and
    a drive means arranged to cause the flap assembly to open from its closed position on activation of the drive means, wherein the drive means comprises a solenoid arranged to applying a pulling force to open the flap assembly.

2. The mechanism of claim 1, wherein the flap assembly comprises a plurality of flaps attached at one end to the elongate member by biasing means arranged to bias the flaps in the closed position.

3. The mechanism of claim 2, wherein the biasing means comprises a torsion spring provided at the end of each flap attached to the elongate member causing the flaps to lie substantially flat along the axial direction in the closed position.

4. The mechanism of claim 1, wherein the drive means further comprises a plunger arranged to be pulled by the solenoid and in engagement with the flap assembly so as to pull the flap assembly towards the housing when the plunger is pulled by the solenoid to force the flap assembly to the open position.

5. The mechanism of claim 2, wherein the flaps, in the closed position, lie along the axis of the mechanism and, in the open position, lie at an angle outwards from the mechanism axis.

6. The mechanism of claim 5 wherein, in the closed position, the end of the flaps not attached to the elongate member abut against the housing at a chamfered surface such that a pulling force caused by actuation of the drive means pulls the flaps against the housing and forces the flaps to open.

7. The mechanism of claim 4, wherein the plunger is spaced from the housing by a biasing means that biases the plunger away from the housing.

8. An actuator assembly comprising an axially moveable lock bolt and a mechanism as claimed in claim 1.

9. A locking mechanism for releasably locking a lock bolt against axial movement, the mechanism comprising:
    an elongate member axially moveable relative to a housing and, in use, in moveable engagement with a lock bolt; and
    a flap assembly moveable between a first, closed position, located between the elongate member and the housing so as to prevent axial movement of the elongate member towards the housing, and a second, open position allowing the elongate member to move axially towards the housing;
    wherein the flap assembly comprises a plurality of flaps attached at one end to the elongate member by biasing means arranged to bias the flaps in the closed position;
    wherein the flaps, in the closed position, lie along the axis of the mechanism and, in the open position, lie at an angle outwards from the mechanism axis;
    wherein, in the closed position, the end of the flaps not attached to the elongate member abut against the housing at a chamfered surface such that a pulling force caused by actuation of drive means pulls the flaps against the housing and forces the flaps to open.

10. The mechanism of claim 9, wherein the biasing means comprises a torsion spring provided at the end of each flap attached to the elongate member causing the flaps to lie substantially flat along the axial direction in the closed position.

11. The mechanism of claim 9, wherein the drive means are arranged to cause the flap assembly to open from its closed position on activation of the drive means.

12. The mechanism of claim 11, wherein the drive means comprises a solenoid arranged to applying a pulling force to open the flap assembly.

13. The mechanism of claim 12, wherein the drive means further comprises a plunger arranged to be pulled by the solenoid and in engagement with the flap assembly so as to pull the flap assembly towards the housing when the plunger is pulled by the solenoid to force the flap assembly to the open position.

14. The mechanism of claim 9, wherein the plunger is spaced from the housing by a biasing means that biases the plunger away from the housing.

15. An actuator assembly comprising an axially moveable lock bolt and a mechanism as claimed in claim 9.

* * * * *